W. H. LAUBACH.
Gas Retort.

No. 20,567.

Patented June 15, 1858.

UNITED STATES PATENT OFFICE.

W. H. LAUBACH, OF PHILADELPHIA, PENNSYLVANIA.

RETORT FOR GENERATING GAS.

Specification of Letters Patent No. 20,567, dated June 15, 1858.

*To all whom it may concern:*

Be it known that I, WILLIAM H. LAUBACH, of the city of Philadelphia, in the State of Pennsylvania, have invented certain new and useful improvements in retorts for generating illuminating-gas from oils, rosin, fatty matters, or other substances which are in a fluid state or which become so by being heated; and I do hereby declare that the following is a full, clear, and exact description of the same, reference being had to the accompanying drawings, forming a part of this specification, in which—

Figure 1:
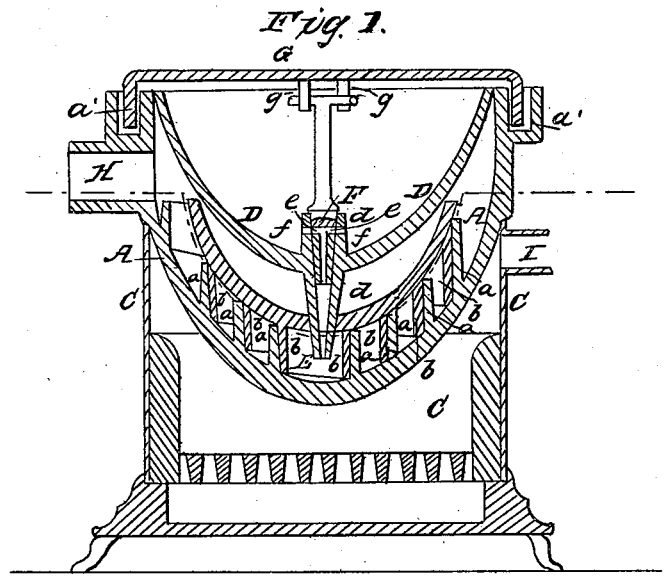
Figure 2:
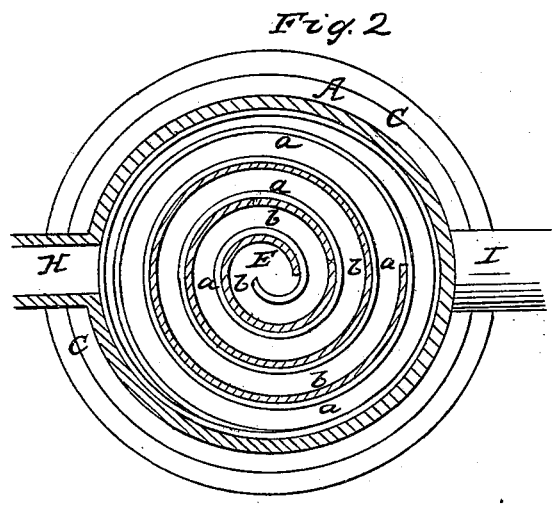

Figure 1, is a vertical central section of a retort and its furnace, constructed according to my invention. Fig. 2, is a horizontal section of the same, in the red line shown in Fig. 1.

Similar letters of reference indicate corresponding parts in both figures.

This invention consists in a certain construction of a retort, by which a very large heating surface is obtained for the generation of gas, and convenience is afforded for cleaning out as often as necessary. It also consists in a certain contrivance for regulating the supply of material to the retort.

To enable others to make and use my invention, I will proceed to describe its construction and operation.

A, is the main body of the retort, consisting of an upright circular cast-iron pan with a semiellipsoidal bottom, (although I do not confine myself to a bottom of such shape, as it may be flat, or of any other description of curvature, than that indicated in the drawing,) and a channel A', around the exterior of its mouth for the reception of water or fusible metal to make the joint of the movable cover G, tight. This pan has an upright thin convolute-formed projection cast on the interior or upper surface of its bottom.

B, is a cast-iron plate of a form corresponding with the bottom of the pan A, but of a somewhat less circumference and having cast on its under side a thin projection $b$, of convolute form, corresponding with the projection $a$, on the interior of the pan or vessel A. This plate B, rests on the top of the projection $a$, and the projections $a$, and $b$, fit into each other, either in contact, or at such distance as their position relatively to each other may place them, and hence the plate B, the bottom of pan A, and their projections $a$, and $b$, combine to produce a long convolute formed passage $c$, in the bottom of the retort, one side of which passage is exposed to the direct action of the fire in the stove or furnace C, into which the pan A, fits. In relation to the said projections $a$, and $b$, it is my intention, if found advisable, also to construct them, or one or more of them, either connected with the plate B, or bottom of pan A, exclusively; or to form a separate convolute plate or partition, and place it between said plate B, and bottom A, either of these arrangements being equivalent to that presented in this description, and the drawings hereto annexed. The convolute projections $a$, and $b$, do not reach quite to the center of the pan A, and hence a chamber E, is formed in the central and bottom portion of the retort communicating with the convolute $c$.

D, is a cast-iron pan which I call the charger, of a form similar to the pan A, into which it fits, and resting on the edges of the plate B. In the center of the charger is a conical tube $d$, which extends some distance above the bottom thereof, and downward through an opening in the center of the plate B, into the chamber E. This tube is bored out to form the seat of a hollow plug valve F, which is fitted thereinto, the said valve being closed at the top, but open at its bottom, and having two orifices $e$, $e$, in its sides, corresponding with two orifices $f$, $f$, in the upper part of the tube $d$, which projects into the pan D. The valve F, has a stem which projects upward and terminates in a T-shaped head, which is received between two pins or projections, $g$, $g$, on the interior of the cover G.

H, is the outlet pipe of the retort leading out at the upper part of one side of the pan A.

I, is the stove chimney.

The operation of the retort is as follows: Fire having been lighted under the retort which soon becomes thoroughly heated, a quantity of material is put into the charger D, and the cover G, is put on; and if the material was not previously in a fluid state it soon becomes so by the heat of the retort. The valve is then turned by turning the cover G, whose pins $g$, $g$, take hold of the T-shaped head of the valve stem to such a position as to bring the orifices $e$, $e$, opposite to those $f$, $f$, to permit a gradual and limited flow of the fluid material into the chamber E, at the bottom of the retort, where it is vaporized, and from whence the vapor escapes into the convolute formed passage c, in which, owing to the great length and large heating surface of the said passage, it is decomposed into permanent gas before it arrives at the outer end, and in that state is permitted to pass off by the pipe H. The supply of fluid material to the retort from the charger D, can be regulated at any time while the retort is in operation, by turning the cover to regulate the opening of the orifices e, e, f, f. The passages c, c, may not at the commencement of the operation, be perfectly tight at the junction of the projections a, b, or where they join the plate B, or the bottom of the pan A, but this is of little consequence, as the small quantity of vapor that might pass between them near the commencement of the passage would be decomposed long before reaching the end of it, and as the operation proceeds, the joints between the said projections would be closed by the condensation of the vapors or formation of lamp-black. The length of the passage c, which can be made very great by making it narrow, and the great heat of the surface thereof, owing to one side being in direct contact with the fire, and the other sides rapidly absorbing the heat through the projections a, a, insures the conversion of the vapor into permanent gas of a very pure character. The moderate heat of the charger, owing to its protection from the great heat of the fire, prevents the formation of vapor therein, and the carbonization of the material upon its surface.

One of the greatest advantages of this retort is the great facility afforded for cleaning it and putting it in order, by any person having no mechanical ability; all that is necessary to be done, being to remove the cover G, then to lift out the charger D, and afterward the plate B, and then to scrape out the chamber E, and surfaces of the passage c, and then replace the parts again.

What I claim as my invention, and desire to secure by Letters Patent, is:—

1. The construction of the retort with a convolute passage made in two parts fitting together in the manner substantially as described, whereby a great amount of heating surface is obtained for the conversion of the vapor into permanent gas, and provision is made for cleaning out the passage.

2. Combining the movable cover G, with the valve F, of the charger by means of a T-shaped head on the valve stem and pins g, g, inside the said cover, or their equivalent, to regulate the supply of fluid material to the retort while in operation by turning the said cover.

W. H. LAUBACH.

Witnesses:
  JOHN CLOUDS,
  JOSEPH MERCER.